US009100100B2

(12) United States Patent
Shi et al.

(10) Patent No.: US 9,100,100 B2
(45) Date of Patent: Aug. 4, 2015

(54) WIRELESS ELECTRONIC DEVICE WITH SWITCHABLE ANTENNA SYSTEM

(71) Applicant: Futurewei Technologies Inc., Plano, TX (US)

(72) Inventors: Ping Shi, San Diego, CA (US); Wee Kian Toh, San Diego, CA (US); Navid Nader, San Diego, CA (US); Jorge Fabrega Sanchez, San Diego, CA (US); Siddardha Naraharisetti, San Jose, CA (US); Vinh Vo, San Diego, CA (US); Robert McCarthy, Escondido, CA (US); Mingliang Du, San Diego, CA (US); Vijayakumar Krishnamurthy, San Marcos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 27 days.

(21) Appl. No.: 14/145,675

(22) Filed: Dec. 31, 2013

(65) Prior Publication Data
US 2015/0188599 A1   Jul. 2, 2015

(51) Int. Cl.
*H04B 1/44* (2006.01)
*H04L 1/18* (2006.01)
*H04L 5/00* (2006.01)

(52) U.S. Cl.
CPC .. *H04B 1/44* (2013.01); *H04L 1/18* (2013.01); *H04L 5/001* (2013.01)

(58) Field of Classification Search
CPC .......... H04B 1/44; H04B 1/40; H04B 7/0805; H04L 1/18; H04L 5/001; H04W 72/0446
USPC ........... 455/78, 101, 575.7, 63.1, 562.1, 103, 455/552.1, 127.2
See application file for complete search history.

(56) References Cited

U.S. PATENT DOCUMENTS

| | | | |
|---|---|---|---|
| 7,190,974 B2 * | 3/2007 | Efland et al. ............... | 455/562.1 |
| 7,869,830 B2 * | 1/2011 | Hartenstein et al. ....... | 455/562.1 |
| 8,159,399 B2 * | 4/2012 | Dorsey et al. ............... | 343/702 |
| 8,325,685 B2 * | 12/2012 | Ebrahimi Tazeh Mahalleh et al. ........................... | 370/336 |
| 8,489,034 B1 * | 7/2013 | Kim et al. ....................... | 455/75 |
| 8,565,701 B2 * | 10/2013 | Sanchez et al. ............ | 455/168.1 |
| 8,868,144 B2 * | 10/2014 | Shi ............................... | 455/575.7 |

* cited by examiner

*Primary Examiner* — Marceau Milord (57) ABSTRACT

Various disclosed embodiments include methods and systems for operating a wireless electronic device having one or more antennas. The method comprises monitoring at least one parameter of a signal received from a remote transmitter. The method includes determining that the at least one parameter meets a first threshold and performing, at the wireless electronic device, a probing operation. The probing operation includes performing an antenna switching operation. The probing operation includes generating first signal information of the received signal prior to the antenna switching operation and generating second signal information of the received signal subsequent to the antenna switching operation. The probing operation includes determining whether the antenna switching operation achieves a desired gain based at least in part on the generated first and second signal information. The probing operation includes reversing the antenna switching operation in response to the desired gain not being achieved.

22 Claims, 6 Drawing Sheets

WIRELESS ELECTRONIC DEVICE WITH SWITCHABLE ANTENNA SYSTEM

TECHNICAL FIELD

The present disclosure relates generally to electronic devices, and more particularly, to wireless electronic devices that have a switchable antenna system.

BACKGROUND

Electronic devices such as handheld electronic devices and other portable electronic devices are becoming increasingly popular. Examples of handheld devices include cellular telephones, handheld computers, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations and may use short-range wireless communications links, such as links for supporting the Wi-Fi (IEEE 802.11) bands and the Bluetooth band.

Antenna design is increasingly challenging as the need to support more frequency bands and more radio access technology continues to grow. In addition, a user's hand position or head position while operating the portable electronic device may have an impact on received signal strength, wireless transmission, etc. It would therefore be desirable to be able to provide electronic devices with improved wireless communications capabilities.

SUMMARY

According to one embodiment, there is provided a method for operating a wireless electronic device having one or more antennas. The method includes monitoring at least one parameter of a signal received from a remote transmitter, determining that at least one monitored parameter meets a first threshold and performing, at the wireless electronic device, a probing operation. The probing operation includes performing an antenna switching operation that switches from a first antenna scheme to a second antenna scheme, where the first antenna scheme is different from the second antenna scheme. The probing operation includes generating first signal information of the received signal prior to the antenna switching operation and generating second signal information of the received signal subsequent to the antenna switching operation. The probing operation includes determining whether the antenna switching operation achieves a desired gain based at least in part on the generated first and second signal information. The probing operation includes, in response to the desired gain being achieved, operating in accordance with the second antenna scheme and, in response to the desired gain not being achieved, reversing the antenna switching operation and operating in accordance with the first antenna scheme.

In another embodiment, there is provided a wireless electronic device. The wireless electronic device comprises one or more antennas, a processor coupled to the one or more antennas, and memory coupled to the processor. The wireless electronic device is configured to monitor at least one parameter of a signal received from a remote transmitter, determine that the at least one monitored parameter meets a first threshold and perform a probing operation. The probing operation includes performing an antenna switching operation that switches from a first antenna scheme to a second antenna scheme, where the first antenna scheme is different from the second antenna scheme. The probing operation includes generating first signal information of the received signal prior to the antenna switching operation and generating second signal information of the received signal subsequent to the antenna switching operation. The probing operation includes determining whether the antenna switching operation achieves a desired gain based at least in part on the generated first and second signal information. The probing operation includes, in response to the desired gain being achieved, operating in accordance with the second antenna scheme and, in response to the desired gain not being achieved, reversing the antenna switching operation and operating in accordance with the first antenna scheme.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
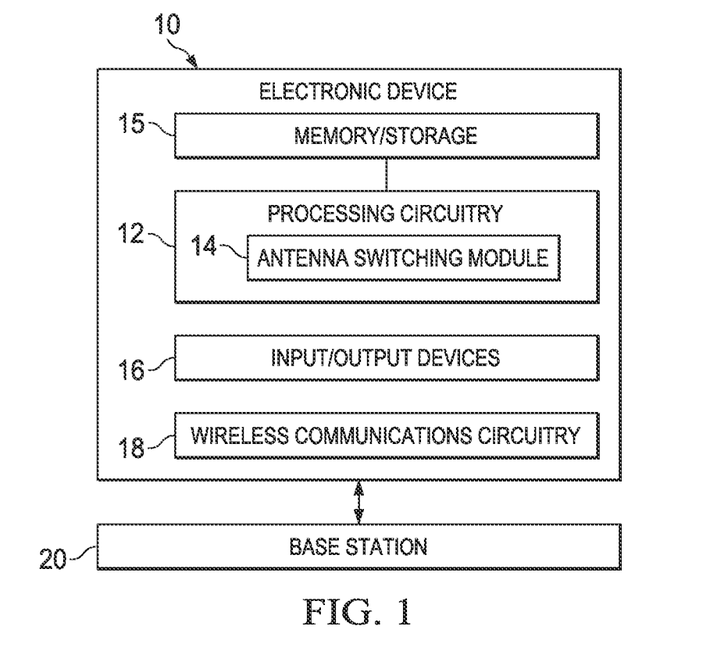
FIG. 1 illustrates a diagram of an illustrative electronic device with antenna switching capabilities according to one embodiment.

FIG. 1 is a diagram of an illustrative electronic device 10 with antenna switching capabilities according to one embodiment. The electronic device 10 may be, for example, a portable wireless electronic device, such as a cellular telephone, a media player with wireless communications capabilities, a handheld computer (also sometimes called a personal digital assistant), a remote controller, a global positioning system (GPS) device, a tablet computer, a handheld gaming device, or the like. The wireless electronic device 10 may also be a hybrid device that combines the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

The wireless electronic device 10 includes processing circuitry 12, an antenna switching module 14 and memory/storage 15. The antenna switching module 14 is configured to control and route radio-frequency signals that are transmitted and received from wireless communications circuitry 18 (e.g., a wireless transceiver) to one or more selected antennas (not shown in FIG. 1). The antenna switching module 14 functions to select which antenna to use in real time based on measurements/parameters of received signals or other data. For example, the antenna switching module 14 may select a particular antenna to use for wireless communications between the device 10 and a base station 20 based on signal strength, BER, BLER, etc.

The memory/storage 15 may be any type of memory or storage, and may include one or more of the following: hard disk drive, nonvolatile memory (e.g., flash memory or other electrically-programmable-read-only memory configured to form a solid state drive), volatile memory (e.g., static or dynamic random-access-memory), and the like.

The processing circuitry 12 is used to control the operation of the electronic device 10. This processing circuitry 12 may be based on and include one or more microprocessors, microcontrollers, digital signal processors, application specific integrated circuits, etc. (not shown in FIG. 1). The processing circuitry 12 may include all the necessary functionality to execute software/firmware, such as internet browsing applications, voice-over-internet-protocol (VOIP) telephone call applications, email applications, media playback applications, operating system functions, functions related to radio-frequency transmission and reception such as selection of communications frequencies, etc. To support interactions with external equipment, the processing circuitry 12 may be used in implementing communications protocols or standards. Communications protocols that may be implemented by the processing circuitry 12 include internet protocols, wireless local area network protocols, protocols for other short-range wireless communications links, etc. Wireless communications operations such as communications frequency selection operations may be controlled using software stored and executed within the electronic device 10.

The electronic device 10 may further include input/output devices 16. For example, a button (such as a menu button) and a display screen with touch screen functionality are examples of input/output devices that may be incorporated within the electronic device 10. A user of the electronic device 10 may supply input commands using user input interface devices such as the button and the display screen. Examples of input interfaces include buttons (e.g., alphanumeric keys, power on-off, and other specialized buttons, etc.), a touch pad, a pointing stick, or other cursor control device, a microphone for supplying voice commands, or any other suitable interface for controlling the electronic device 10.

The input/output devices 16 may include one or more communication connections such as ports (e.g., power jacks, data ports, audio-visual jacks to drive headphones, a monitor, or other external audio-video equipment, a subscriber identity module (SIM) card port to authorize cellular telephone service, a memory card slot, etc.) or connectors that allow the electronic device 10 to communicate with other computers/applications.

The electronic device 10 includes the wireless communications circuitry 18 for communicating wirelessly with external equipment or devices. Therefore, the electronic device 10 may sometimes be referred to as a wireless device or a wireless electronic device. The wireless communications circuitry 18 typically includes radio-frequency (RF) transceiver circuitry formed from one or more integrated circuits, baseband circuitry, power amplifier circuitry, low-noise input amplifiers, passive RF components, one or more antennas, transmission lines, and other circuitry such as front-end circuitry for handling RF wireless signals (not specifically shown). Wireless signals can also be sent using light (e.g., using infrared communications).

The wireless communications circuitry 18 may also include radio-frequency transceiver circuitry for operating within various radio-frequency communications bands. For example, the wireless communications circuitry 18 may include transceiver circuitry that operates within communications bands for Wi-Fi communications and/or operates within the communication band for Bluetooth communications. The wireless communications circuitry 18 may include cellular telephone transceiver circuitry for wireless communications in cellular telephone bands, LTE bands, and other bands (as examples). The wireless communications circuitry 18 may include functionality for voice data, non-voice data, and may even include global positioning system (GPS) receiver equipment for receiving GPS signals or for handling other satellite positioning data.

During operation, the electronic device 10 monitors at least one parameter of a wireless signal received from a remote transmitter, and based on this monitoring, determines whether a probing operation or process should be performed. This determination may be based on one or more parameters meeting a predetermined threshold and related to the following (as illustrative examples): received signal strength, signal quality, pilot signal strength, and/or difference between a measured received signal strength of a main receiver and a measured received signal strength of a reference or diversity receiver.

During the probing operation, an antenna switching operation is performed that "switches" from one antenna scheme to a second (different) antenna scheme. Signal information about the received signal is measured/monitored at the wireless device 10 and/or received from a remote transmitter, both before and after the antenna switching operation. The wireless device 10 utilizes this measured/monitored signal information and/or received signal information to determine whether the antenna switching operation (from one antenna scheme to another antenna scheme) has achieved a desired gain or benefit. If so, the wireless device operates in accordance with the second antenna scheme. If not, the antenna switching operation is reversed back to the first original antenna scheme and the wireless device 10 operates in accordance with the original antenna scheme. As will be appreciated, different antenna schemes could be attempted subsequently.

Figure 2:
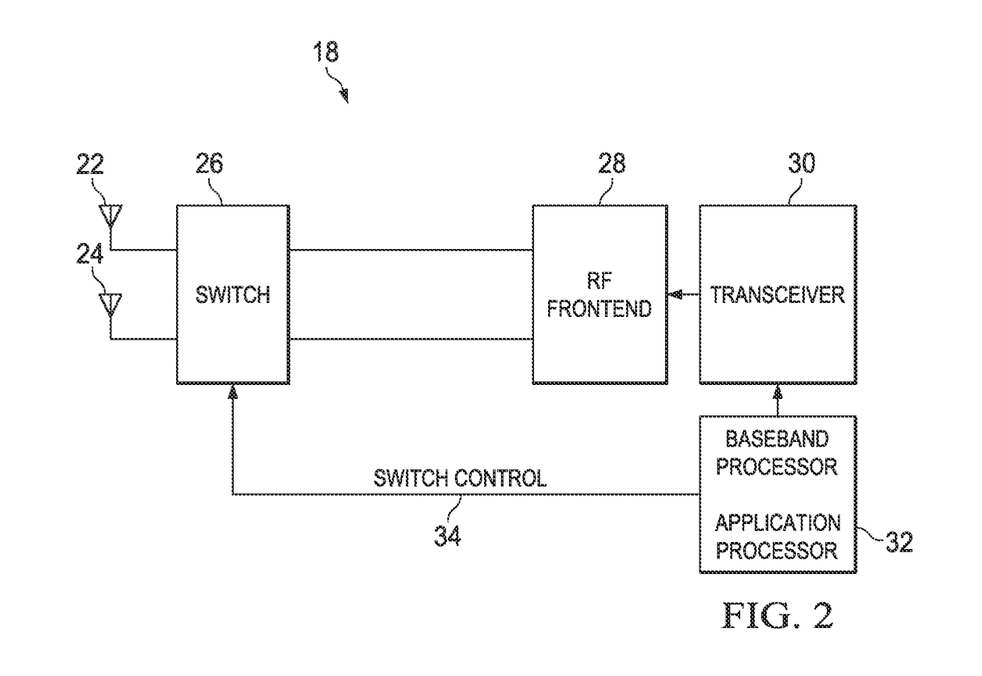
FIG. 2 illustrates a diagram of wireless communications circuitry with dual antennas and antenna switching circuitry according to one embodiment.

FIG. 2 illustrates a diagram of the wireless communications circuitry 18 including a first antenna 22, a second antenna 24, and antenna switching circuitry 26 according to one embodiment. The wireless communications circuitry 18 includes front-end circuitry 28 that controls radio-frequency signals that are transmitted and received by the wireless communications circuitry 18. The front-end circuitry 28 may include filtering circuitry and other components. The antenna switching circuitry 26 is illustrated as being interposed between the front-end circuitry 28 and the first and second antennas 22, 24. Alternatively, the front-end circuitry 28 may include the antenna switching circuitry 26.

The antenna switching circuitry 26 is configured via control path 34 to selectively route transmitted signals to the first antenna 22, the second antenna 24, or both the first and second antennas 22, 24. Control signals may be provided to the antenna switching circuitry 26 via control path 34 from the processing circuitry 12 of FIG. 1, baseband circuitry 32, or any desired control circuitry. Similarly, the antenna switching circuitry 26 is configured via control path 34 to selectively route received radio-frequency signals from a selected one of the first antenna 22 and the second antenna 24 (as described in further detail below with respect to FIG. 5) or, alternatively, to selectively route radio-frequency signals that are received substantially simultaneously from both the first and second antennas 22, 24 (e.g., by performing antenna receive diversity) as described in further detail below with respect to FIG. 4.

The wireless communications circuitry 18 includes radio-frequency (RF) transceiver circuitry 30 formed from one or more integrated circuits. For example, the transceiver circuitry 30 may be configured to operate within various radio-frequency communications bands such as the bands for Wi-Fi (IEEE 802.11) communications, the band for Bluetooth communications, cellular telephone bands, the LTE bands, other bands, or any combination thereof. The transceiver circuitry 30 may contain one or more transmitters and one or more receivers. The transmitters and receivers may be implemented using one or more integrated circuits (e.g., cellular telephone communications circuits, wireless local area network communications circuits, circuits for Bluetooth communications, etc.) The transceiver circuitry 30 may be formed with associated power amplifier circuits for increasing transmitted signal power, low noise amplifier circuits for increasing signal power in received signals, other suitable wireless communications circuits, and combinations of these circuits. The transceiver circuitry 30 is configured to modulate the data or signals for transmission by one or more of the antennas 22, 24 and demodulate the data or signals received by one or more of the antennas 22, 24.

The baseband circuitry 32 is coupled to the transceiver circuitry 30 and is configured to provide control signals to the antenna switching circuitry 26 via the control path 34. The baseband circuitry 32 may include a baseband processor, an application processor, or any combination thereof. It will be understood that the baseband circuitry 32 and the transceiver 30 may be separate components or integrated together.

Figure 3:
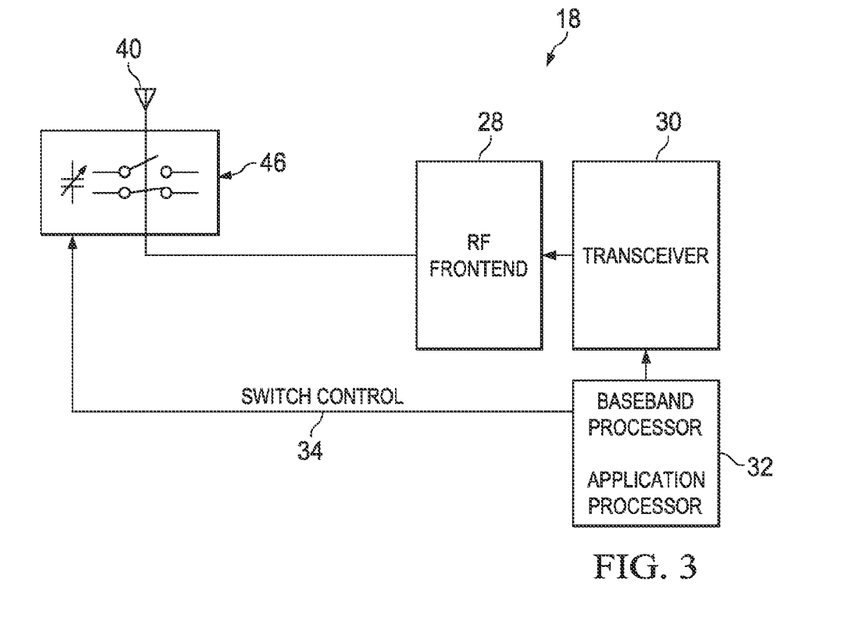
FIG. 3 illustrates a diagram of wireless communications circuitry with a switchable antenna and antenna switching circuitry according to one embodiment.

FIG. 3 illustrates a diagram of the wireless communications circuitry 18 with a switchable antenna 40. The switchable antenna 40 includes antenna switching circuitry 46. In one embodiment, the antenna switching circuitry 46 may be embedded in the switchable antenna 40. In another embodiment, the antenna switching circuitry 46 may be physically separate from the switchable antenna 40 but coupled to the switchable antenna 40. The wireless communications circuitry 18 includes the front-end circuitry 28 of FIG. 2, the transceiver circuitry 30 of FIG. 2, and the baseband circuitry 32 of FIG. 2. Control signals may be provided to the antenna switching circuitry 46 from the baseband circuitry 32 via the control path 34.

The switchable antenna 40 may include one or more radiators and one or more switches that enable the switchable antenna 40 to operate in a plurality of different states. The switchable antenna 40 may be reconfigured from one state or stage to another state or stage by turning the one or more switches on or off, and the radiation pattern of the switchable antenna 40 may change as the switchable antenna 40 is reconfigured such that a beam of the switchable antenna 40 is steerable.

The antenna switching circuitry 46 differs from the antenna switching circuitry 26 of FIG. 2 in that the switchable antenna 40 may be tuned by the antenna switching circuitry 46 via tunable matching circuitry, where an antenna aperture of the switchable antenna 40 is unchanged. Alternatively, the switchable antenna 40 may be tuned by the antenna switching circuitry 46 via aperture tuning circuitry, where the antenna aperture is changed as the switchable antenna 40 is tuned. The antenna switching circuitry 46 may include tuning components such as a tunable capacitor. The tunable capacitor may include a variable capacitor such as a pin-diode or a barium strontium titanate (BST) film varactor. The tunable capacitor may also include a switchable capacitor array such as a micro-electro-mechanical systems (MEMS) capacitor array or a switched complementary metal-oxide-semiconductor (CMOS) array. Alternatively, the tuning components may include a switchable inductor/capacitor, switches, any combination of the above components, or modules containing switches, capacitors, and/or inductors. The switchable antenna 40 herein refers to the aperture tunable antenna.

Figure 4:
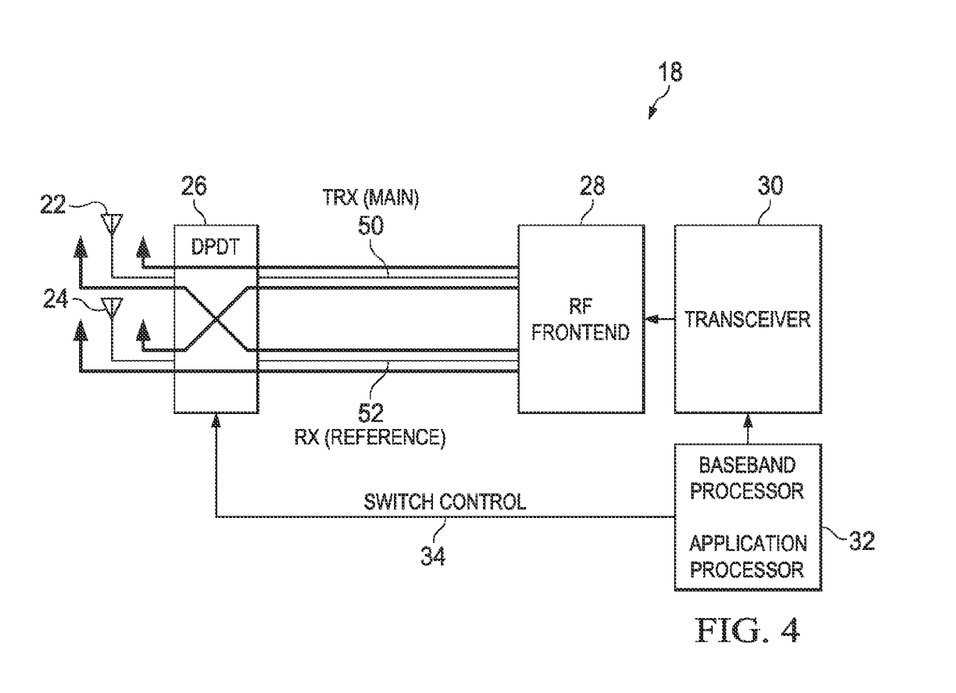
FIG. 4 illustrates a diagram of wireless communications circuitry with dual antennas including a reference antenna and antenna switching circuitry according to one embodiment.

FIG. 4 illustrates a diagram of the wireless communications circuitry 18 including the first antenna 22, the second antenna 24, and the antenna switching circuitry 26 according to one embodiment. As an illustrative example, the antenna switching circuitry 26 may include a Double Pole Double Throw (DPDT) semiconductor switch. In the illustrated embodiment of FIG. 4, the first antenna 22 and the second antenna 24 are coupled to the front-end circuitry 28 in an antenna diversity (or MIMO) scheme such that diversity/MIMO transmission and reception is enabled via a main path 50 and a reference/diversity/MIMO path 52 in response to a main transceiver associated with the main path 50 and a reference/diversity/MIMO transceiver associated with the reference path 52 being used in signal decoding. Alternatively, the main path 50 and the reference/diversity/MIMO path 52 may be "switched" or "swapped" when a main antenna (e.g., one of the first antenna 22 and the second antenna 24) and a reference antenna (e.g., the other of the first antenna 22 and the second antenna 24) are switched or swapped as discussed in further detail below.

During operation, if a reference receiver associated with the reference antenna is not used in signal decoding (e.g., no diversity reception), then the electronic device 10 may in the background continuously monitor at least one parameter of a wireless signal received from a remote transmitter, such as signal strength, a block error rate (BLER), a bit error rate (BER), or a cyclic redundancy check (CRC) as non-limiting examples, compare a value of the monitored parameter to a predetermined value, and if the value of the monitored parameter satisfies the predetermined value, the antennas may be switched or swapped. For example, if the first antenna 22 is the main antenna associated with the main path 50 and the second antenna 24 is the reference antenna associated with the reference or diversity path 50, and if a sudden deterioration in signal quality of a channel is detected, the antennas 22, 24 may be switched or swapped so that the second antenna 24 becomes the main antenna associated with the main path 50 and the first antenna 22 becomes the reference antenna associated with the reference or diversity path 50.

A processor, such as the application processor or the baseband processor of the baseband circuitry 32, is adapted to compare a value of the monitored parameter to the predetermined value and determine whether the value of the monitored parameter satisfies the predetermined value. The processor is also coupled via the control path 34 to the antenna switching circuitry 26, which is controlled by the processor based on the monitored parameter first threshold determination.

In response to determining that the value of the monitored parameter satisfies the predetermined value, the processor can control the antenna switching circuitry 26 to select the antenna (e.g., main or reference) having the best signal condition. The processor may also be implemented using a central processing unit of the electronic device 10. The processor may be a general purpose, special purpose or digital signal processor, and may be a plurality of processors or combination of such processors. The processor includes functionality to perform signal coding, data processing, power control, input/output processing, and/or any other functionality enabling the electronic device 10 to operate.

During background monitoring, the electronic device 10 via the processor may periodically monitor one or more other parameters of the wireless signal received from the remote transmitter and based on the periodic monitoring, the electronic device 10 may determine whether a probing operation or process should be performed. This determination may be based on one or more parameters meeting a predetermined threshold.

For example, the processor (e.g., the application processor or the baseband processor of the baseband circuitry 32) is adapted to compare a signal strength indicator, such as the signal-to-noise ratio (SNR), receive signal code power (RSCP) or a received signal strength indication (RSSI) of a received signal of the main or first antenna 22 received via the main path 50 to an SNR, an RSCP or an RSSI value of a received signal of the reference or second antenna 24 received via the reference or diversity/MIMO path 52. If a comparison of the signal strength values does not satisfy another predetermined threshold, no action with regard to the probing operation may be taken. If the comparison of the signal strength values satisfies the predetermined threshold, then the probing operation may be performed for a period of time.

During the probing operation, the electronic device 10 via the processor is configured to perform an antenna switching operation that "switches" from a first antenna scheme to a second (different) antenna scheme, to measure/monitor signal information about received signals both before and after the antenna switching operation, and to determine whether the probing operation switching of antennas achieves a desired gain or benefit. If so, the wireless device 10 operates in accordance with the second antenna scheme. If not, the antenna switching operation is reversed back to the first original antenna scheme and the wireless device 10 operates in accordance with the original antenna scheme.

The signal information may be based on one or more of received signal strength, received signal code power, and transmitter feedback/control information (e.g., transmitter power control information received from a base station) as non-limiting examples.

The probing operation may include the electronic device 10 switching or swapping from a first antenna scheme to a second antenna scheme (e.g., swapping the main antenna from the first antenna 22 to the second antenna 24 and the reference/diversity/MIMO antenna from the second antenna 24 to the first antenna 22), measuring/monitoring signal information about the received signals (e.g., sampling transmitter feedback/control information shortly before and shortly after switching the main and reference antennas), and determining whether the antenna switching operation has achieved a desired gain or benefit (e.g., determining whether to reverse the switching of antennas based at least in part on a comparison of the sampled transmitter feedback/control information).

To illustrate, the processor (e.g., the baseband circuitry 32) is coupled to the antenna switching circuitry 26 and is configured to perform the antenna switching operation from the first antenna scheme to the second antenna scheme (e.g., swapping the main antenna from the first antenna 22 to the second antenna 24 and the reference/diversity/MIMO antenna from the second antenna 24 to the first antenna 22).

After swapping or switching the main and reference/diversity/MIMO antennas, the electronic device 10 via the processor is configured to determine whether the probing operation switching of antennas (from one antenna scheme to another antenna scheme) achieves a desired gain or benefit. For example, the electronic device 10 may sample signal information, such as transmitter power control information received from the base station 20 of FIG. 1, shortly before and shortly after swapping the main and reference antennas. If it is determined that a comparison of the value of the transmitter power control information received shortly after swapping exceeds a value of the transmitter power control information received shortly before swapping by a predetermined amount, (e.g., an increase in transmitter power control is associated with greater path loss), then a further determination may be made based on whether a reference receiver is used in signal decoding.

For example, if an increase in transmitter power control is determined, and if the reference receiver associated with the reference antenna is used in signal decoding, then the electronic device 10 via the processor may reverse the probing operation switching of antennas. Alternatively, if the reference receiver associated with the reference antenna is not used in signal decoding (e.g., no diversity) then a reversal of the probing operation switching of antennas may be based on both the transmitter power control information and on another parameter.

For example, if the reference receiver associated with the reference antenna is not used in signal decoding, then the electronic device 10 via the processor may compare the signal strength indicator of the received signal (e.g., SNR, RSCP or RSSI) of the main or first antenna 22 to the signal strength value of the second antenna 24. In response to determining that the comparison of the signal strength values satisfies a threshold, and that an increase in transmitter power control is determined, the electronic device 10 via the processor may reverse the probing operation switching of antennas such that the first antenna 22 is again the main antenna.

Figure 5:
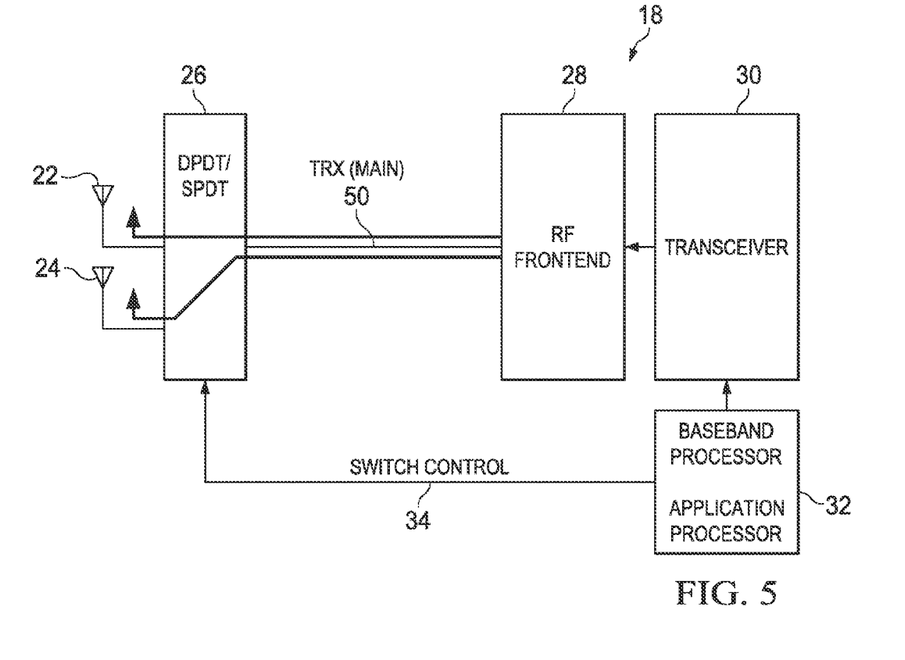
FIG. 5 illustrates a diagram of wireless communications circuitry with dual antennas, no reference antenna and switching circuitry according to another embodiment.

FIG. 5 illustrates a diagram of the wireless communications circuitry 18 including the first antenna 22, the second antenna 24, and the antenna switching circuitry 26 according to another embodiment. As an illustrative example, the antenna switching circuitry 26 may include a Double Pole Double Throw (DPDT) semiconductor switch or a Single Pole Double Throw (SPDT) semiconductor switch. In the illustrated embodiment of FIG. 5, the first antenna 22 and the second antenna 24 are coupled to the front-end circuitry 28 such that both the first antenna 22 and the second antenna 24 are available for use, but only one of the first antenna 22 and the second antenna 24 is in use at a time (e.g., no reference antenna).

During operation, the electronic device 10 may in the background continuously monitor at least one parameter of a wireless signal received from a remote transmitter (e.g., the BLER, the BER, or the CRC), compare a value of the monitored parameter to a predetermined threshold value, and if the value of the monitored parameter satisfies the predetermined threshold value, the antennas may be switched or swapped. For example, if the first antenna 22 is in use, and if a sudden deterioration in signal quality of a channel is detected, the antennas 22, 24 may be switched or swapped so that the second antenna 24 is in use and the first antenna 22 is no longer in use.

A processor, such as the application processor or the baseband processor of the baseband circuitry 32, is adapted to compare a value of the monitored parameter to the predetermined threshold value and determine whether the value of the monitored parameter satisfies the predetermined threshold value. The processor is also coupled via the control path 34 to the antenna switching circuitry 26, which is controlled by the processor based on the monitored parameter predetermined threshold determination. In response to determining that the value of the monitored parameter satisfies the predetermined threshold value, the processor can control the antenna switching circuitry 26 to select the antenna (e.g., the first antenna 22 or the second antenna 24) having the best signal condition.

During background monitoring, the electronic device 10 via the processor may periodically monitor one or more other parameters of the wireless signal received from the remote transmitter and based on the periodic monitoring, the electronic device 10 may determine whether a probing operation or process should be performed. This determination may be based on one or more parameters meeting a predetermined threshold.

For example, assuming that the first antenna 22 is in use, the processor is adapted to compare the signal strength value such as the signal-to-noise ratio (SNR), the received signal code power (RSCP) or a received signal strength indication (RSSI) of the received signal of the first antenna 22 to a predetermined threshold value. If the value of the signal strength of the first antenna 22 does not satisfy the predetermined threshold, no action with regard to the probing operation may be taken. If the value of the signal strength of the first antenna 22 satisfies the predetermined threshold, then the probing operation may be implemented for a period of time.

During the probing operation, the electronic device 10 via the processor is configured to perform an antenna switching operation that switches from a first antenna scheme to a second (different) antenna scheme, to measure/monitor signal information about received signals both before and after the antenna switching operation, and to determine whether the probing operation switching of antennas achieves a desired gain or benefit. If so, the wireless device 10 operates in accordance with the second antenna scheme. If not, the antenna switching operation is reversed back to the first original antenna scheme and the wireless device 10 operates in accordance with the original antenna scheme. For example, the probing operation may include the electronic device 10 switching or swapping from a first antenna scheme to a second antenna scheme (e.g., switching from using the first antenna 22 to using the second antenna 24), measuring/monitoring signal information about the received signals (e.g., sampling the transmitter feedback/control information shortly before and shortly after switching from the first antenna to the second antenna), and determining whether the antenna switching operation has achieved a desired gain or benefit (e.g., determining whether to reverse the antenna switching based on one or more of the sampled transmitter feedback/control information or other sampled signal information).

To illustrate, the processor (e.g., the baseband circuitry 32) is coupled to the antenna switching circuitry 26 and is configured to perform the antenna switching operation from the first antenna scheme to the second antenna scheme (e.g., switching from using the first antenna 22 to using the second antenna 24).

After swapping the first and second antennas 22, 24, the electronic device 10 via the processor is configured to determine whether the probing operation switching of antennas achieves a desired gain or benefit. For example, the electronic device 10 may sample signal information, such as the transmitter feedback/control information (e.g., the transmitter power control information received from the base station 20 of FIG. 1), shortly before and shortly after switching or swapping the first and second antennas 22, 24 and compare the sampled transmitted feedback/control information. In addition, the electronic device 10 may sample other signal information such as the signal-to-noise ratio (SNR), received signal code power (RSCP) or a received signal strength indication (RSSI) shortly before and shortly after switching or swapping the first and second antennas 22, 24 and compare the other sampled signal information.

If it is determined that a comparison of the value of the transmitter power control information received shortly after swapping and the value of the transmitter power control information received shortly before swapping satisfies a predetermined amount (e.g., an increase in transmitter power control is associated with greater path loss), and/or that a comparison of the value of the other sampled signal information (e.g., the RSSI) received shortly before and shortly after swapping satisfies another predetermined amount, then the electronic device 10 via the processor may reverse the probing operation switching of antennas such that the first antenna 22 is again the main antenna.

Figure 6:
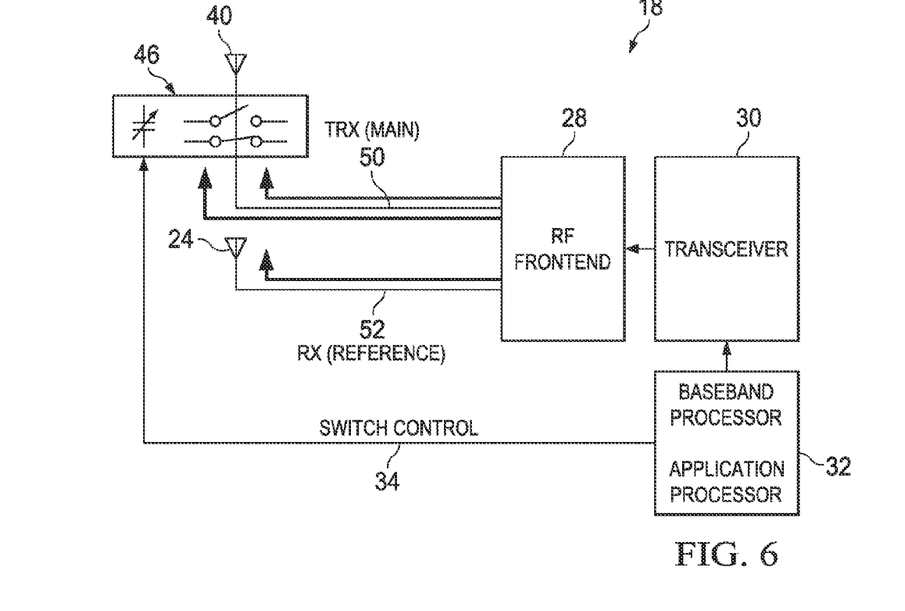
FIG. 6 illustrates a diagram of wireless communications circuitry with dual antennas including a switchable antenna, a reference antenna and antenna switching circuitry according to still another embodiment.

FIG. 6 illustrates a diagram of the wireless communications circuitry 18 including the switchable antenna 40, the second antenna 24, and the antenna switching circuitry 46 according to another embodiment. In the illustrated embodiment of FIG. 6, the switchable antenna 40 and the second antenna 24 are coupled to the front-end circuitry 28 in an antenna diversity/MIMO scheme such that diversity/MIMO transmission and reception is enabled via the main path 50 and the reference/diversity/MIMO path 52. In the illustrated embodiment of FIG. 6, the second antenna 24 is "fixed" as a reference or diversity/MIMO antenna such that there is no "swapping" between the switchable antenna 40 and the second antenna 24. Instead, the second antenna 24 remains as the reference or diversity/MIMO antenna and the switchable antenna 40 is configured to switch between antenna states (e.g., the antenna radiation pattern changes as the antenna is reconfigured) as described in further detail below.

During operation, the electronic device 10 may in the background continuously monitor at least one parameter measured from a wireless signal received from a remote transmitter (e.g., the block error rate (BLER), the bit error rate (BER), or the Cyclic Redundancy Check(CRC)), compare a value of the monitored parameter to a predetermined threshold value, and if the value of the monitored parameter satisfies the predetermined threshold value, antenna switching occurs where a state of the switchable antenna 40 is changed. For example, if the switchable antenna 40 is operating in a first state with a first radiation pattern, and if a sudden deterioration in signal quality of a channel is detected, the switchable antenna 40 may be configured to switch from the first state to a second state (with a second radiation pattern) so that the switchable antenna 40 is operating in the second state.

A processor, such as the application processor or the baseband processor of the baseband circuitry 32, is adapted to compare a value of the monitored parameter to the predetermined threshold value and determine whether the value of the monitored parameter satisfies the predetermined threshold value. The processor is also coupled via the control path 34 to the antenna switching circuitry 46, which is controlled by the processor based on the monitored parameter predetermined threshold determination. In response to determining that the value of the monitored parameter satisfies the predetermined threshold value, the processor can control the antenna switching circuitry 46 to select another state of the switchable antenna 40.

During background monitoring, the electronic device 10 via the processor may periodically monitor one or more other parameters of the wireless signal received from the remote transmitter and based on the periodic monitoring, the electronic device 10 may determine whether a probing operation or process should be performed. This determination may be based on one or more parameters meeting a predetermined threshold.

For example, the processor (e.g., the application processor or the baseband processor of the baseband circuitry 32) is configured to compare the signal strength indicator such as the SNR, the RSCP or the RSSI of the received signal of the reference or second antenna 24 to a predetermined threshold value. If the value of the signal strength of the second antenna 24 does not satisfy the predetermined threshold, no action with regard to the probing operation may be taken. If the value of the signal strength of the received signal of the second antenna 24 satisfies the predetermined threshold, then one or more other parameters may be monitored to determine whether to perform the probing operation or process.

For example, the electronic device 10 via the processor is configured to sample measured signal information such as the SNR, the RSCP or the RSSI of the received signals of both the switchable antenna 40 and the second antenna 24 during first and second time intervals. The processor is configured to compare a difference between the sampled signal information of the switchable antenna 40 and the second antenna 24 during the first time interval (e.g., RSSI difference between the main antenna and the reference/diversity/MIMO antenna during the first time interval) with a difference between the sampled signal information of the switchable antenna 40 and the second antenna 24 during the second time interval (e.g., RSSI difference between the main antenna and the reference/ diversity/MIMO antenna during the second time interval). A determination of whether the probing operation should be performed may be based on the comparison.

During the probing operation, the electronic device 10 via the processor is configured to perform an antenna switching operation that switches from a first antenna scheme to a second (different) antenna scheme, to measure/monitor signal information about received signals both before and after the antenna switching operation, and to determine whether the probing operation switching of antennas achieves a desired gain or benefit. If so, the wireless device 10 operates in accordance with the second antenna scheme. If not, the antenna switching operation is reversed back to the first original antenna scheme and the wireless device 10 operates in accordance with the original antenna scheme. For example, the probing operation may include the electronic device 10 switching from a first antenna scheme to a second antenna scheme (e.g., switching states of the switchable antenna 40 from a first state to a second state), measuring/monitoring signal information about the received signals, such as sampling the transmitter feedback/control information shortly before switching (e.g., during the first state) and shortly after switching (e.g., during the second state) and sampling the SNR, the RSCP or the RSSI of the received signals shortly before switching (e.g., during the first state) and shortly after switching (e.g., during the second state), and determining whether the antenna switching operation has achieved a desired gain or benefit (e.g., determining whether to reverse the antenna switching based on the measured/monitored signal information).

To illustrate, the processor (e.g., the baseband circuitry 32) is coupled to the antenna switching circuitry 46 and is configured to perform the antenna switching operation from the first antenna scheme to the second antenna scheme (e.g., switching from the first state of switchable antenna 40 to the second state of switchable antenna 40).

After switching states of the switchable antenna 40 from the first state to the second state, the electronic device 10 via the processor is configured to determine whether the probing operation switching of antenna states achieves a desired gain or benefit. For example, the electronic device 10 may sample signal information, such as the transmitter feedback/control information (e.g., the transmitter power control information received from the base station 20 of FIG. 1) shortly before (e.g., during the first state) and shortly after (e.g., during the second state) switching antenna states and compare the sampled transmitted feedback/control information. In addition, the electronic device 10 may sample other signal information such as the SNR, the RSCP or the RSSI of received signals of the switchable antenna 40 shortly before switching (e.g., during the first state) and shortly after switching (e.g., during the second state) and compare the other sampled signal information.

If it is determined that a comparison of the value of the transmitter power control information received shortly after switching and the value of the transmitter power control information received shortly before switching satisfies a predetermined threshold (e.g., an increase in transmitter power control is associated with greater path loss), and/or that a comparison of the value of the other sampled signal information (e.g., the RSSI) received shortly before and shortly after swapping satisfies another predetermined threshold, then the electronic device 10 via the processor may reverse the probing operation switching of antenna states such that the switchable antenna 40 switches back to the first state from the second state.

Figure 7:
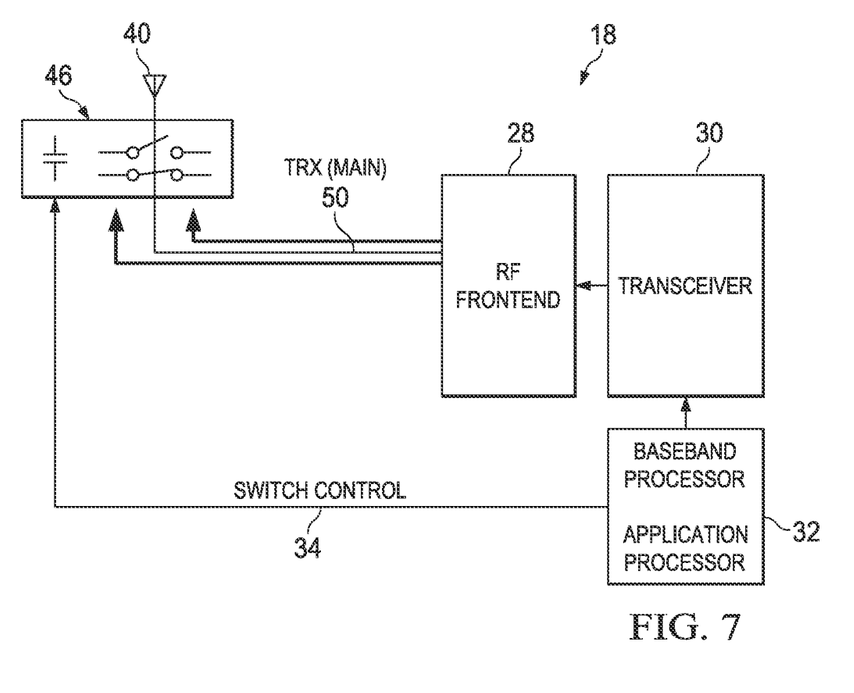
FIG. 7 illustrates a diagram of wireless communications circuitry with a single switchable antenna, no reference antenna and antenna switching circuitry according to yet another embodiment.

FIG. 7 illustrates a diagram of the wireless communications circuitry 18 including the switchable antenna 40 and the antenna switching circuitry 46 according to another embodiment. In the illustrated embodiment of FIG. 7, the switchable antenna 40 is coupled to the front-end circuitry 28 without a reference/diversity/MIMO antenna.

During operation, the electronic device 10 may in the background continuously monitor at least one parameter of a wireless signal received from a remote transmitter (e.g., the BLER, the BER, or the CRC), compare a value of the monitored parameter to a predetermined threshold value, and if the value of the monitored parameter satisfies the predetermined threshold value, switch a state of the switchable antenna from a first state to a second state. For example, if the switchable antenna 40 is operating in a first state, and if a sudden deterioration in signal quality of a channel is detected, the switchable antenna 40 may be configured to switch from the first state to a second state so that the second state of the switchable antenna 40 is in operation.

The processor (e.g., the baseband circuitry 32) is coupled to the antenna switching circuitry 46 and is configured to perform the antenna switching operation from the first antenna scheme to the second antenna scheme (e.g., switching from the first state of switchable antenna 40 to the second state of switchable antenna 40). The processor is also coupled via the control path 34 to the antenna switching circuitry 46, which is controlled by the processor based on the monitored parameter predetermined threshold determination. In response to determining that the value of the monitored parameter satisfies the predetermined threshold value, the processor can control the antenna switching circuitry 46 to select another state of the switchable antenna 40.

During background monitoring, the electronic device 10 via the processor may periodically monitor one or more other parameters of the wireless signal received from the remote transmitter and based on the periodic monitoring, the electronic device 10 may determine whether a probing operation or process should be performed. This determination may be based on one or more parameters meeting a predetermined threshold.

For example, assuming that the switchable antenna 40 is operating in a first state, the processor is adapted to compare the signal strength value such as the SNR, the RSCP or the RSSI of the received signal of the switchable antenna 40 in the first state to another predetermined threshold value. If the value of the signal strength of the switchable antenna 40 in the first state does not satisfy the predetermined threshold, no action with regard to the probing operation may be taken. If the value of the signal strength of the switchable antenna 40 in the first state satisfies the predetermined threshold, then the probing operation may be performed for a period of time.

During the probing operation, the electronic device 10 via the processor is configured to perform an antenna switching operation that switches from a first antenna scheme to a second (different) antenna scheme, to measure/monitor signal information about received signals both before and after the antenna switching operation, and to determine whether the probing operation switching of antennas achieves a desired gain or benefit. If so, the wireless device 10 operates in accordance with the second antenna scheme. If not, the antenna switching operation is reversed back to the first original antenna scheme and the wireless device 10 operates in accordance with the original antenna scheme. For example, the probing operation may include the electronic device 10 switching or swapping from a first antenna scheme to a second antenna scheme (e.g., switching states of the switchable antenna 40 from a first state to a second state), measuring/monitoring signal information about the received signals (e.g., sampling the transmitter feedback/control information shortly before switching states (e.g., when in the first state) and shortly after switching states (e.g., when in the second state)), and determining whether the antenna switching operation has achieved a desired gain or benefit (e.g., determining whether to reverse the antenna switching of states based on one or more of the sampled transmitter feedback/control information or other sampled signal information).

To illustrate, the processor (e.g., the baseband circuitry 32) is coupled to the antenna switching circuitry 46 and is configured to perform the antenna switching operation from the first antenna scheme to the second antenna scheme (e.g., switching from the first state of switchable antenna 40 to the second state of switchable antenna 40).

After switching states of the switchable antenna 40 from the first state to the second state, the electronic device 10 via the processor is configured to determine whether the probing operation switching of antenna states achieves a desired gain or benefit. For example, the electronic device 10 may sample signal information, such as the transmitter feedback/control information (e.g., the transmitter power control information received from the base station 20 of FIG. 1) shortly before (e.g., during the first state) and shortly after (e.g., during the second state) switching antenna states and compare the sampled transmitted feedback/control information. In addition, the electronic device 10 may sample other signal information such as the SNR, the RSCP or the RSSI of received signals of the switchable antenna 40 shortly before switching (e.g., during the first state) and shortly after switching (e.g., during the second state) and compare the other sampled signal information.

If it is determined that a comparison of the value of the transmitter power control information received shortly after switching and the value of the transmitter power control information received shortly before switching satisfies a predetermined threshold (e.g., an increase in transmitter power is associated with greater path loss), and/or that a comparison of the value of the other sampled signal information (e.g., the RSSI) received shortly before and shortly after switching satisfies another predetermined threshold, then the electronic device 10 via the processor may reverse the probing operation switching of antenna states such that the switchable antenna 40 switches back to the first state from the second state.

Figure 8A:
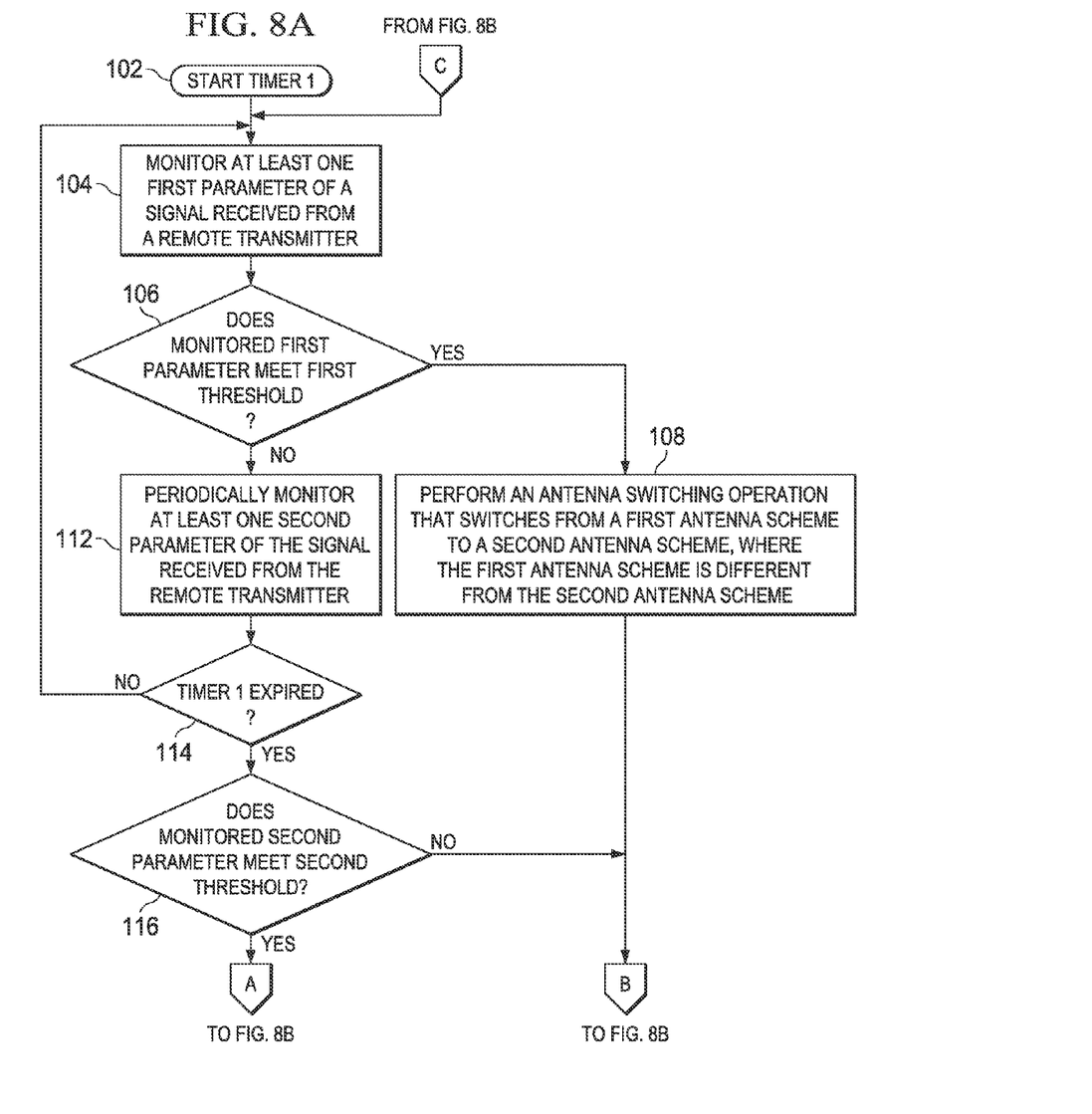
FIG. 8A-8B illustrates a flow diagram illustrating a method of operating a wireless electronic device having a switchable antenna system according to one embodiment.
Figure 8B:
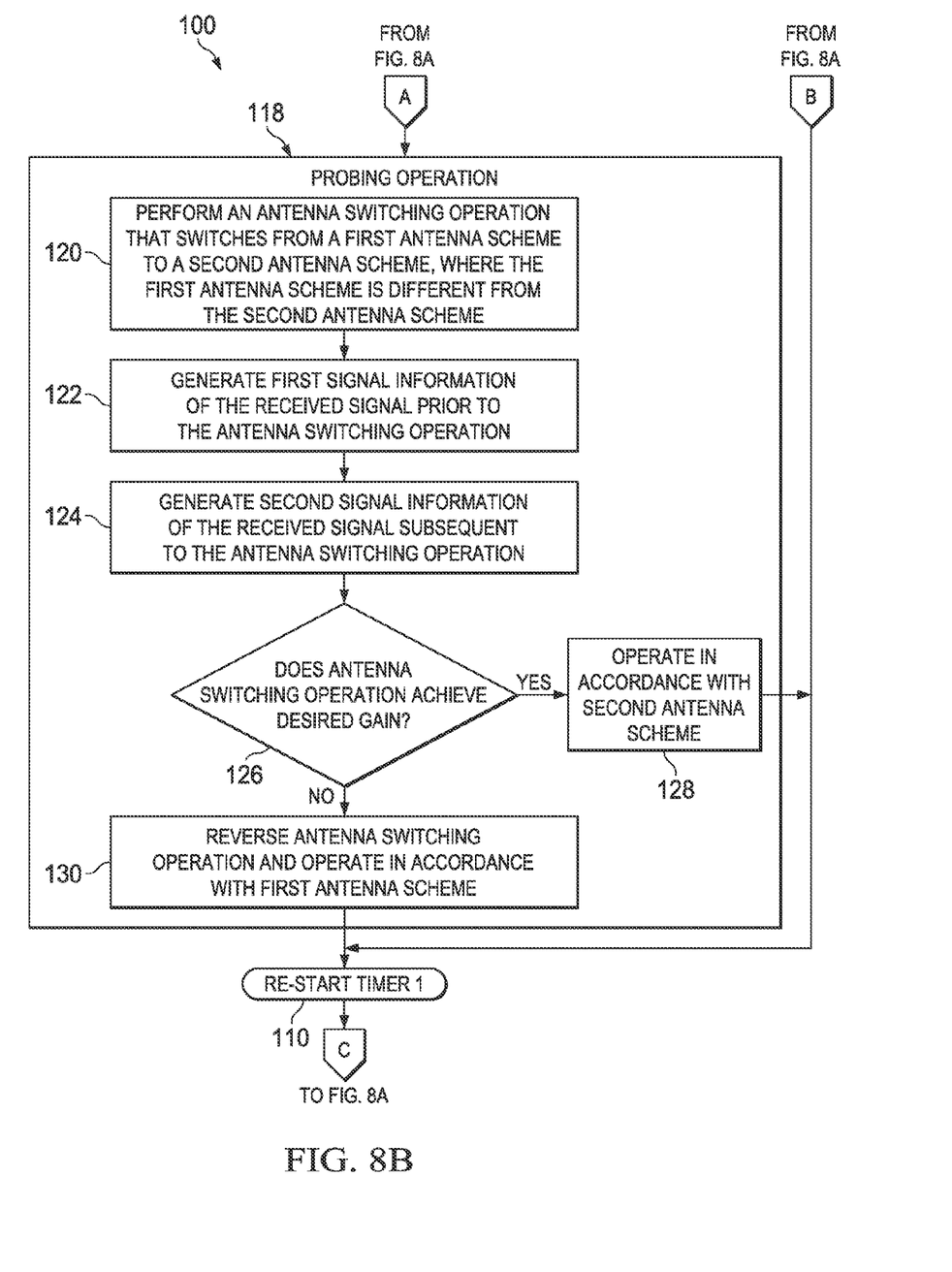

FIG. 8 is a flow diagram illustrating a method 100 of operating a wireless electronic device having one or more antennas in accordance with disclosed embodiments that may be performed, for example, by a wireless electronic device such as the wireless electronic device 10 of FIG. 1.

A first timer is started, at step 102 and at least one first parameter of a signal received from a remote transmitter is monitored at a wireless electronic device, at step 104. For example, the electronic device 10 via a processor (e.g., the application processor or the baseband processor of the baseband circuitry 32 of FIG. 1) is adapted to monitor parameters such as block error rate (BLER), bit error rate (BER), cyclic redundancy check (CRC), received signal strength, signal quality, pilot signal strength, and/or a difference between a measured received signal strength of a main receiver and a measured received signal strength of a reference or diversity receiver.

A determination is made whether the at least one monitored first parameter meets a first threshold, at step 106. For example, a determination may be made whether a sudden deterioration in signal quality of a channel is detected. If the monitored first parameter meets the first threshold, then an antenna switching operation is performed, at step 108 and the first timer is reset, at step 110. For example, the electronic device 10 is configured to perform an antenna switching operation that switches from a first antenna scheme to a second (different) antenna scheme. For example, the antenna switching operation may include switching the main antenna from the first antenna 22 to the second antenna 24 and the reference/diversity/MIMO antenna from the second antenna 24 to the first antenna 22. Alternatively, the antenna switching operation may include switching from using the first antenna 22 to using the second antenna 24. Alternatively, the antenna switching operation may include switching states of the switchable antenna 40 from a first state to a second state.

If the monitored first parameter does not meet the first threshold, then at least one second parameter of the signal received from the remote transmitter is periodically monitored at the wireless electronic device, at step 112. For example, the electronic device 10 via the processor may periodically monitor one or more other parameters of the wireless signal received from the remote transmitter and based on the periodic monitoring, the electronic device 10 may determine whether a probing operation or process should be performed.

A determination is made whether the first timer has expired, at step 114. If the first timer has not expired, the method reverts to step 104. If the first timer has expired, then a determination is made whether the at least one monitored second parameter meets a second threshold, at step 116. For example, the processor (e.g., the application processor or the baseband processor of the baseband circuitry 32) is adapted to compare a signal strength indicator, such as the signal-to-noise ratio (SNR), receive signal code power (RSCP) or a received signal strength indication (RSSI) of a received signal of the main or first antenna 22 received via the main path 50 to an SNR, an RSCP or an RSSI value of a received signal of the reference or second antenna 24 received via the reference or diversity/MIMO path 52.

If the monitored second parameter does not meet the second threshold, then the method reverts to step 110. If the monitored second parameter meets the second threshold, then a probing operation may be performed for a period of time, at step 118.

The probing operation includes performing an antenna switching operation, at step 120. For example, as described above, the electronic device 10 is configured to perform an antenna switching operation that "switches" from a first antenna scheme to a second (different) antenna scheme.

The probing operation includes generating first signal information of the received signal prior to the antenna switching operation, at step 122. For example, generating the first signal information may include receiving signal feedback information, such as transmitter power control information, from the remote transmitter or measuring one or more parameters of the received signal, such as a signal strength value (e.g., SNR, RSCP or RSSI) of the received signal.

The probing operation includes generating second signal information of the received signal subsequent to the antenna switching operation, at step 124. For example, generating the second signal information may include receiving signal feedback information, such as transmitter power control information, from the remote transmitter or measuring one or more parameters of the received signal, such as a signal strength value (e.g., SNR, RSCP or RSSI) of the received signal.

The probing operation includes determining whether the antenna switching operation achieves a desired gain based at least in part on the generated first and second signal information, at step 126. For example, the electronic device 10 may utilize measured/monitored signal information and/or received signal information to determine whether the antenna switching operation from a first antenna scheme to a second (different) antenna scheme has achieved a desired gain or benefit. If so, then the electronic device operates in accordance with the second antenna scheme, at step 128, and the first timer is reset, at step 110. For example, the electronic device may determine whether a comparison of the value of the transmitter power control information received shortly after swapping and the value of the transmitter power control information received shortly before swapping satisfies a predetermined threshold, and/or whether a comparison of the value of other sampled signal information (e.g., the RSSI) received shortly before and shortly after swapping satisfies another predetermined threshold. If so, then the electronic device 10 operates in accordance with the second antenna scheme, and the first timer is reset.

The probing operation includes reversing the antenna switching operation in response to the desired gain not being achieved, at step 130. For example, if the electronic device 10 determines that desired gain has not been achieved, then the electronic device 10 may reverse the probing operation antenna switching operation at step 130, and reset the first timer, at step 110. For example, the antenna switching operation is reversed back to the first antenna scheme, the electronic device operates in accordance with the first antenna scheme, and the first timer is reset.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of operating a wireless electronic device having one or more antennas, the method comprising:
   monitoring at least one parameter of a signal received from a remote transmitter;
   determining that the at least one monitored parameter meets a first threshold and performing, at the wireless electronic device, a probing operation, wherein the probing operation comprises:
      performing an antenna switching operation that switches from a first antenna scheme to a second antenna scheme, wherein the first antenna scheme is different from the second antenna scheme,
      generating first signal information of the received signal prior to the antenna switching operation,
      generating second signal information of the received signal subsequent to the antenna switching operation,
      determining whether the antenna switching operation achieves a desired gain based at least in part on the generated first and second signal information,
      in response to the desired gain being achieved, operating in accordance with the second antenna scheme, and
      in response to the desired gain not being achieved, reversing the antenna switching operation and operating in accordance with the first antenna scheme.

2. The method in accordance with claim 1, wherein generating the first signal information of the received signal comprises at least a one of: receiving signal feedback information from the remote transmitter or measuring one or more parameters of the received signal.

3. The method in accordance with claim 2, wherein generating the second signal information of the received signal comprises at least a one of: receiving signal feedback information from the remote transmitter or measuring one or more parameters of the received signal.

4. The method in accordance with claim 3, wherein the one or more antennas comprise a first antenna associated with a main path and a second antenna associated with a reference path, wherein the first antenna and the second antenna are configured to receive radio-frequency signals substantially concurrently, and wherein the antenna switching operation comprises changing an operative connection of the first antenna from the main path to the reference path and changing an operative connection of the second antenna from the reference path to the main path such that both the first antenna and the second antenna are in use substantially concurrently.

5. The method in accordance with claim 3, wherein the one or more antennas comprise a first antenna associated with a first path and a second antenna associated with a second path, wherein the first antenna and the second antenna are each configured to receive radio-frequency signals, and wherein the antenna switching operation comprises changing an operative connection of the first antenna from an operative state to an inoperative state and changing an operative connection of the second antenna from an inoperative state to an operative state such that only one of the first antenna and the second antenna is in use at a time.

6. The method in accordance with claim 5, further comprising, prior to performing the probing operation, performing the antenna switching operation in response to determining that another one of the at least one monitored parameter meets a second threshold.

7. The method in accordance with claim 3, wherein the one or more antennas comprise a first antenna coupled to a main path and a second antenna coupled to a reference path, wherein the first antenna comprises a switchable antenna having a plurality of operable states and an inoperable state, wherein the first antenna and the second antenna are configured to receive radio-frequency signals substantially concurrently, and wherein the antenna switching operation comprises changing a state of the first antenna from a first operable state to a second operable state such that both the first antenna and the second antenna are in use substantially concurrently.

8. The method in accordance with claim 7, further comprising, prior to performing the probing operation, performing the antenna switching operation in response to determining that another one of the at least one monitored parameter meets a second threshold.

9. The method in accordance with claim 3, wherein the one or more antennas comprise a switchable antenna coupled to a main path, wherein the switchable antenna includes a plurality of operable states and an inoperable state, and wherein the antenna switching operation comprises changing a state of the first antenna from a first operable state to a second operable state such that only the switchable antenna is in use.

10. The method in accordance with claim 9, further comprising, prior to performing the probing operation, performing the antenna switching operation in response to determining that another one of the at least one monitored parameter meets a second threshold.

11. The method in accordance with claim 1, further comprising, prior to performing the probing operation, performing the antenna switching operation in response to determining that another one of the at least one monitored parameter meets a second threshold.

12. A wireless electronic device, comprising:
one or more antennas;
a processor coupled to the one or more antennas;
memory coupled to the processor; and
wherein the wireless electronic device is configured to:
monitor at least one parameter of a signal received from a remote transmitter;
determine that the at least one monitored parameter meets a first threshold and perform a probing operation, wherein the probing operation comprises:
performing an antenna switching operation that switches from a first antenna scheme to a second antenna scheme, wherein the first antenna scheme is different from the second antenna scheme,
generating first signal information of the received signal prior to the antenna switching operation,
generating second signal information of the received signal subsequent to the antenna switching operation,
determining whether the antenna switching operation achieves a desired gain based at least in part on the generated first and second signal information,
in response to the desired gain being achieved, operating in accordance with the second antenna scheme, and
in response to the desired gain not being achieved, reversing the antenna switching operation and operating in accordance with the first antenna scheme.

13. The wireless electronic device in accordance with claim 12, wherein the first signal information of the received signal comprises at least a one of: signal feedback information received from the remote transmitter or one or more measured parameters of the received signal.

14. The wireless electronic device in accordance with claim 13, wherein the second signal information of the received signal comprises at least a one of: signal feedback information received from the remote transmitter or one or more measured parameters of the received signal.

15. The wireless electronic device in accordance with claim 14, wherein the one or more antennas comprise a first antenna associated with a main path and a second antenna associated with a reference path, wherein the first antenna and the second antenna are configured to receive radio-frequency signals substantially concurrently, and wherein the antenna switching operation comprises changing an operative connection of the first antenna from the main path to the reference path and changing an operative connection of the second antenna from the reference path to the main path such that both the first antenna and the second antenna are in use substantially concurrently.

16. The wireless electronic device in accordance with claim 14, wherein the one or more antennas comprise a first antenna associated with a first path and a second antenna associated with a second path, wherein the first antenna and the second antenna are each configured to receive radio-frequency signals, and wherein the antenna switching operation comprises changing an operative connection of the first antenna from an operative state to an inoperative state and changing an operative connection of the second antenna from an inoperative state to an operative state such that only one of the first antenna and the second antenna is in use at a time.

17. The wireless electronic device in accordance with claim 16, further configured, prior to performing the probing operation, to perform the antenna switching operation in response to determining that another one of the at least one monitored parameter meets a second threshold.

18. The wireless electronic device in accordance with claim 14, wherein the one or more antennas comprise a first antenna coupled to a main path and a second antenna coupled to a reference path, wherein the first antenna comprises a switchable antenna having a plurality of operable states and an inoperable state, wherein the first antenna and the second antenna are configured to receive radio-frequency signals substantially concurrently, and wherein the antenna switching operation comprises changing a state of the first antenna from a first operable state to a second operable state such that both the first antenna and the second antenna are in use substantially concurrently.

19. The wireless electronic device in accordance with claim 18 further configured, prior to performing the probing operation, to perform the antenna switching operation in response to determining that another one of the at least one monitored parameter fails to meet a second threshold.

20. The wireless electronic device in accordance with claim 14, wherein the one or more antennas comprise a switchable antenna coupled to a main path, wherein the switchable antenna includes a plurality of operable states and an inoperable state, and wherein the antenna switching operation comprises changing a state of the first antenna from a first operable state to a second operable state such that only the switchable antenna is in use.

21. The wireless electronic device in accordance with claim 20, further configured, prior to performing the probing operation, to perform the antenna switching operation in response to determining that another one of the at least one monitored parameter meets a second threshold.

22. The wireless electronic device in accordance with claim 12 further configured, prior to performing the probing operation, to perform the antenna switching operation in response to determining that another one of the at least one monitored parameter meets a second threshold.

* * * * *